US012679163B2

(12) United States Patent
Snyder

(10) Patent No.: US 12,679,163 B2
(45) Date of Patent: Jul. 14, 2026

(54) TRACK BAR BUSHING SYSTEM FOR VEHICLE WOBBLE MITIGATION

(71) Applicant: Daniel Snyder, Latrobe, PA (US)

(72) Inventor: Daniel Snyder, Latrobe, PA (US)

( * ) Notice: Subject to any disclaimer, the term of this patent is extended or adjusted under 35 U.S.C. 154(b) by 408 days.

(21) Appl. No.: 18/527,525

(22) Filed: Dec. 4, 2023

(65) Prior Publication Data

US 2025/0128566 A1 Apr. 24, 2025

Related U.S. Application Data

(60) Provisional application No. 63/591,770, filed on Oct. 20, 2023.

(51) Int. Cl.
*B60G 21/055* (2006.01)

(52) U.S. Cl.
CPC .. *B60G 21/0553* (2013.01); *B60G 2204/1222* (2013.01)

(58) Field of Classification Search
CPC .................. B60G 21/0553; B60G 2204/1222
USPC .......................... 267/258, 279–281, 292–294
See application file for complete search history.

(56) References Cited

U.S. PATENT DOCUMENTS

| | | | | |
|---|---|---|---|---|
| 2,221,884 A | * | 11/1940 | Schmidt | F16F 1/38 |
| | | | | 267/141.7 |
| 2,659,619 A | * | 11/1953 | Kishline | F16F 1/38 |
| | | | | 267/293 |

| | | | | |
|---|---|---|---|---|
| 2,728,593 A | * | 12/1955 | Hutton | F16C 27/063 |
| | | | | 403/224 |
| 3,801,209 A | | 4/1974 | Matsuka | |
| 4,477,197 A | * | 10/1984 | Choate | F16C 33/20 |
| | | | | 384/296 |
| 5,224,790 A | | 7/1993 | Hein | |
| 5,286,014 A | * | 2/1994 | Chakko | F16C 17/10 |
| | | | | 267/293 |
| 5,961,219 A | * | 10/1999 | Maughan | F16F 1/38 |
| | | | | 384/220 |
| 6,082,721 A | * | 7/2000 | Kingsley | F16C 23/04 |
| | | | | 411/359 |
| 6,557,874 B2 | | 5/2003 | Fader | |
| 6,585,223 B1 | * | 7/2003 | VanDenberg | F16F 1/387 |
| | | | | 248/584 |
| 6,893,034 B2 | | 5/2005 | Fader | |
| 7,270,341 B2 | | 9/2007 | Longworth et al. | |
| 7,300,064 B2 | | 11/2007 | Johnson et al. | |
| 7,318,593 B2 | | 1/2008 | Sterly et al. | |
| 7,648,145 B2 | | 1/2010 | Wilson et al. | |
| 8,192,106 B2 | | 6/2012 | Vogler et al. | |
| 8,523,207 B2 | | 9/2013 | Dodd | |
| 8,613,460 B2 | | 12/2013 | Juwa et al. | |
| 8,733,771 B2 | | 5/2014 | Johnson et al. | |
| 9,546,705 B2 | | 1/2017 | Ishimatsu et al. | |
| 10,099,530 B2 | | 10/2018 | Gries | |

(Continued)

*Primary Examiner* — Christopher P Schwartz

(74) *Attorney, Agent, or Firm* — McNees Wallace & Nurick LLC

(57) ABSTRACT

The invention encompasses a track bar bushing system for vehicles, specifically designed to mitigate undesired movement or misalignment in both new and older vehicle models. The core component is a bushing material boasting a hardness range of 80-90 D Shore durometer. This bushing system includes an encapsulated multi-piece design comprising a casing of stainless steel halves, providing both corrosion resistance and robust support to all bushing surfaces.

13 Claims, 7 Drawing Sheets

(56)  References Cited

U.S. PATENT DOCUMENTS

| 10,155,424 | B1 * | 12/2018 | Elterman | ............... | B60G 7/001 |
|---|---|---|---|---|---|
| 10,308,069 | B1 | 6/2019 | Farradas | | |
| 10,767,721 | B2 | 9/2020 | Zimmerman et al. | | |
| 2011/0170814 | A1 | 7/2011 | Nakamura et al. | | |
| 2023/0132410 | A1 | 5/2023 | Emin | | |

* cited by examiner

TRACK BAR BUSHING SYSTEM FOR VEHICLE WOBBLE MITIGATION

CROSS-REFERENCE TO RELATED APPLICATIONS

This application claims benefit of provisional application Ser. No. 63/591,770, filed Oct. 20, 2023, the contents of which are incorporated herein by reference.

FIELD OF THE INVENTION

The present invention relates generally to vehicular suspension components, and more particularly to a bushing system for track bars. The invention is designed to mitigate the effects commonly known as "wobble," ensuring optimal axle alignment and improved vehicle suspension performance.

BACKGROUND OF THE INVENTION

Vehicle suspension, particularly in trucks and other vehicles with live axles, often utilize a track bar, also referred to as a Panhard rod, to keep the front or rear axle aligned with the vehicle's centerline. The bushings holding the track bar in place are crucial to its functionality. The bushings are pressed into the ends of the track bar by hand, hand-press, and/or hydraulic press for example. Once pushed into the track bar end, the bar with bushing connects to the vehicle chassis using a bolt through a rigid frame. When these bushings wear out or are not adequately robust, the bar and the axle might shift in lateral directions, leading to potential misalignment.

One of the most concerning outcomes of this misalignment is a phenomenon colloquially termed "death wobble." This rapid and violent shaking of the front axle and steering wheel can be triggered by various factors, including changes in front-end alignment due to lift kits, heavier off-road tires, imbalanced tires, and more.

Conventional solutions have attempted to address this issue by employing different bushing designs and materials. Predominantly, these include injection-molded polyurethane bushings in a three-piece arrangement or bonded rubber styles mimicking the original design. However, these traditional bushings, while competent as vibration absorbers, often succumb to wear and fatigue, especially under rugged conditions or with aftermarket modifications. The inherent softness of their material can even cause "death wobble" in relatively new vehicles.

Consequently, there remains a significant need for a more effective, durable, and resilient track bar bushing system.

SUMMARY OF THE INVENTION

The present invention addresses the limitations and challenges associated with conventional track bar bushing systems found not only in vehicles subjected to challenging terrains but also, alarmingly, in new trucks direct from the factory. Offered is an innovative solution aimed at enhancing the durability, effectiveness, and service life of track bar bushings, ultimately mitigating the effects of the misalignment phenomenon commonly referred to as "wobble." Thus, the instant invention introduces a multi-piece, e.g. four-piece encapsulated bushing design crafted from a harder 80-90 D Shore durometer material. This material undergoes CNC machining to achieve the highest level of precision, ensuring a snug and accurate fit within the assembly, setting it apart from softer materials favored in high-production manufacturing processes.

A further feature of the invention is its incorporation of not just an inner insert but an outer casing that comes together in two halves. This design ensures the bushing is fully supported both internally and along its outer edges. The bushing sleeves/cups, made of stainless steel, offer rust and corrosion resistance, adding to the overall longevity and resilience of the assembly.

It is further an objective of the present invention to provide a track bar bushing, further characterized by its bushing material being shaped to ensure a precise fit within the assembly, irrespective of the specific manufacturing technique.

It is further an objective of the present invention to provide a track bar bushing, further characterized by its ability to maintain consistent linkage with a vehicle's axle and significantly improve the vehicle's suspension performance.

It is further an objective of the present invention to provide a track bar bushing, further characterized in that the system is designed to address challenges associated with axle alignment in vehicles, applicable to both new and older models.

It is further an objective of the present invention to provide a track bar bushing, further characterized in that the bushing material, due to its specified hardness range, offers enhanced performance and durability over traditionally used materials.

By offering comprehensive support to all bushing surfaces through the sleeve cups and track bar itself, this invention comprehends a substantially enhanced service life and unparalleled strength, marking a significant advancement for vehicle suspension performance.

Therefore and more specifically, provided is a bushing system for use with a track bar, comprising a casing subassembly, the casing subassembly further comprising a split case, in one embodiment having two halves, wherein one of the halves is an inner sleeve and the other of the halves is an outer sleeve, the outer sleeve upon assemblage being a mirror image of the inner sleeve; in one embodiment each sleeve is packed against each other at respective inward surfaces imparting an axial load thereon; the sleeves forming a pocket or cavity defined above an external surface of each sleeve; and, a bushing subassembly, the bushing subassembly further comprising a pair of inserts, each insert packed within the cavity, thereby abutting the external surface of each sleeve and further adapted to be abutted by the end of the track bar upon connection therewith; and, a central bore defined within the bushing system into which a bolt can be inserted for fastening the bushing system to a frame or chassis of a vehicle, in turn fixing the track bar.

In an alternative embodiment, the sleeve of the casing subassembly is not split, but is an integral sleeve which includes two, detached flanges disposed above and abutting the external surface of the sleeve.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
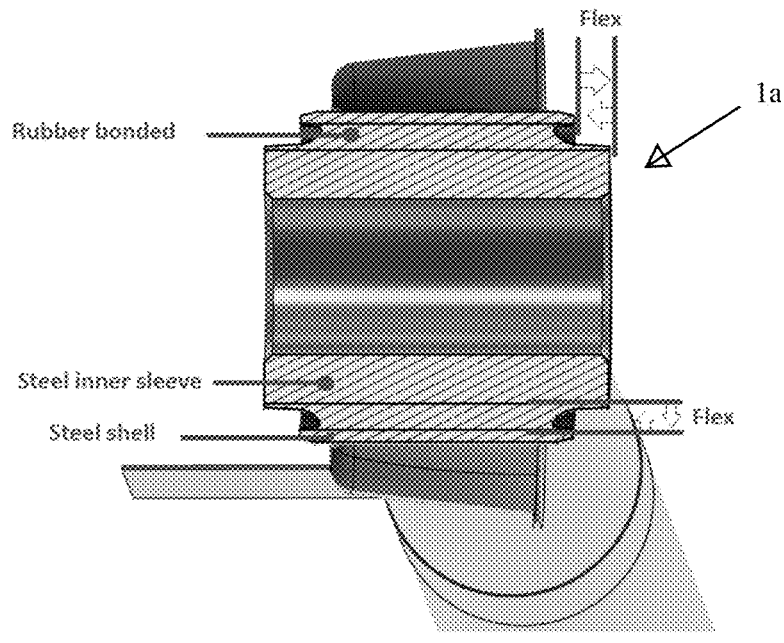
FIG. 1 shows a perspective view of a prior art bushing system at the end of a track bar.

Referring now to the drawings, wherein like reference numerals designate identical or corresponding parts throughout the several views, particularly to FIGS. 1 through 6, the encapsulated bushing system for track bars, termed herein as the bushing system 1 is described in detail.

Figure 2:
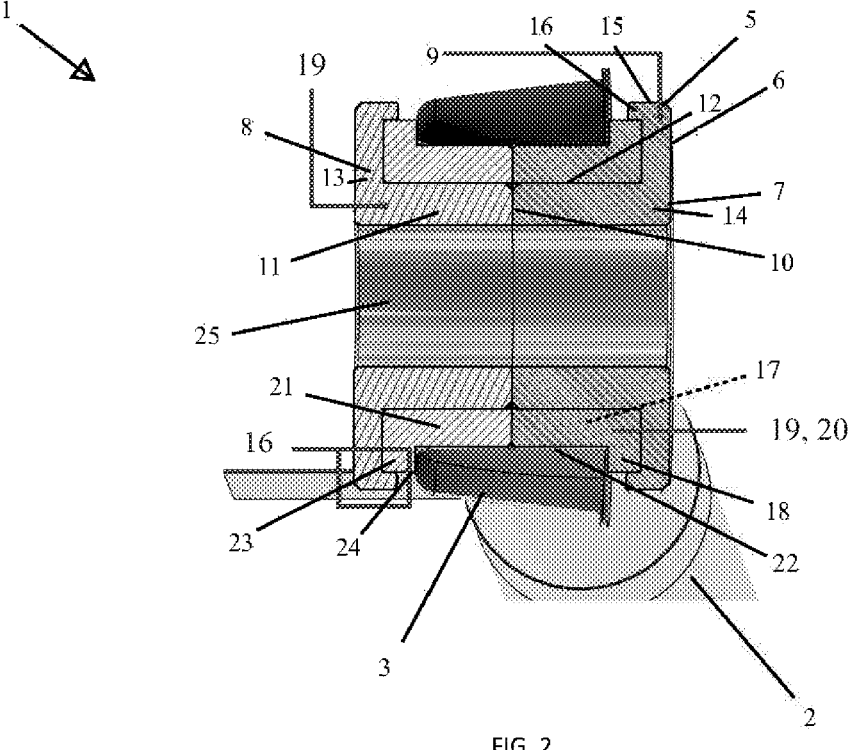
FIG. 2 shows a cross-sectional view through a vertical plane of the instant invention revealing the internal support and alignment of the bushing within the outer casing and the interaction with the track bar.
Figure 3:
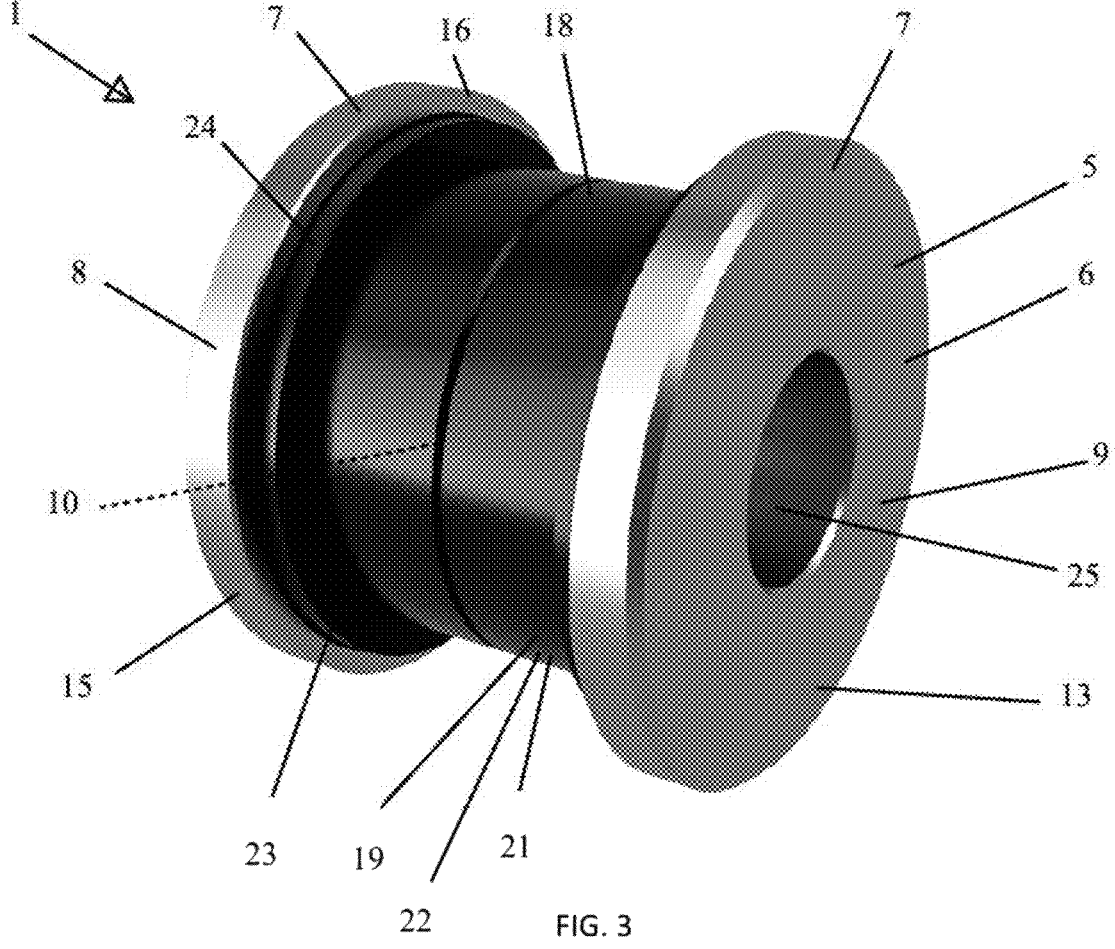
FIG. 3 shows a perspective view of the present bushing system upon assemblage.
Figure 4:
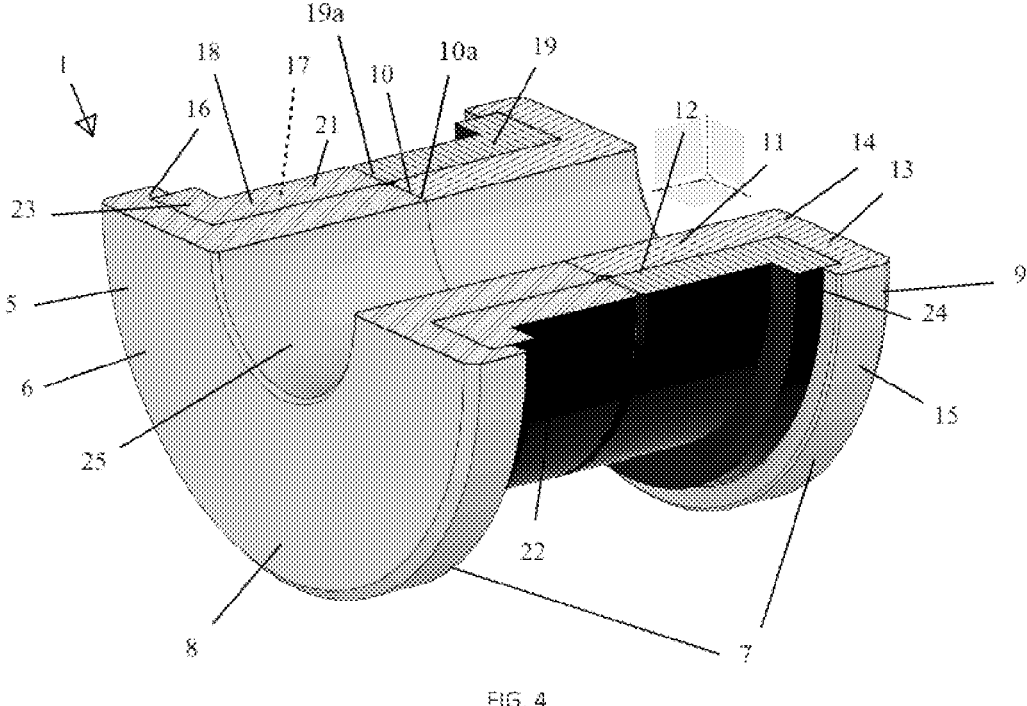
FIG. 4 shows a perspective view in cross-section.

Provided is a bushing system 1 for a vehicle track bar 2 comprising two main subassemblies, being a casing subassembly 5 and a bushing subassembly 18. In one embodiment (FIGS. 1-4), the casing subassembly 5 is generally a split case 6 having two halves 7, wherein one of the halves 7 is an inner sleeve 8 and the other of the halves 7 is an outer sleeve 9. "Outer" and "inner" in all respects is meant only for distinguishing purposes and does not need to define a particular location of each half, as they are interchangeable. In all embodiments, sleeves 8, 9 (and integral sleeve 28 at FIG. 5) are preferably made of stainless steel and shaped substantially identical to each other, the outer sleeve 9 upon assemblage being a mirror image of the inner sleeve 8. "Assemblage" means all components put together in use or ready for use at the track bar end 3 as shown by FIG. 2 for example. "Substantially" here means identical but for very minor variances in machining tolerances. In one embodiment, each sleeve 8, 9 is packed against the other at respective inward surfaces 10, imparting an axial load thereon. Thus, the inner sleeve 8 and the outer sleeve 9 form the casing subassembly as segmented and cooperatively assembled with the respective inward surfaces of each sleeve, 8, 9 configured to join together to define a sleeve seam 10a. "Axial" in all instances means relative to an axis of central bore 25 (further described), i.e. also through the track bar end 3 (the bushing system 1 is symmetrical about a trans-axial plane and axial plane). Note the sleeve seam 10a is therefore trans-axial. The stainless steel pair of sleeves 8, 9, or cups, are critical and play a dual role. First, they provide a corrosion-resistant casing 6 that ensures longevity. Secondly, they deliver comprehensive support to all bushing surfaces (as further described), internally and externally, making certain that the bushing system 1 remains uniformly supported and aligned within the track bar 2 assembly.

Each sleeve 8, 9 has an external surface 12, a first portion 11 and a flange 13 extending from an end 14 of the first portion 11 and perpendicularly thereto as shown, thereby each flange 13 has a diameter greater than the first portion 11. In other words, the flange 13 terminates to form the sleeve outermost surface 15. The sleeve outer-most surface 15 is at a diameter which is greater than the diameter of the external surface 12 to thereby form each sleeve 8, 9 as generally L-shaped in cross-section ("generally" here meaning similar to as shown and but for the lip 16). The sleeve outer-most surface 15 extends inward to form the lip 16, which thereby extends axially. In this manner, the sleeves 8, 9 form a cavity or pocket 17 defined above the external surface 12 and below the lip 16 of each sleeve 8, 9 to capture inserts 19.

The next subassembly is the bushing subassembly 18, which, for both embodiments, is disposed within the casing subassembly 5 (outer casing) as follows. The bushing subassembly 18 comprises a pair of inserts 19, each insert 19 consisting of a bushing material 20 being a plastic composite of a hardness range of 80-90 D Shore durometer. In particular, the composite of the bushing material is a high-performance acetal resin. Central to the system's design is this bushing material 20.

Critically, the bushing material 20 of inserts 19 is crafted from an 80-90 D Shore durometer material, selected for its unparalleled hardness and resilience against wear and fatigue. The inserts 19 are meticulously shaped using CNC machining techniques, ensuring a precise, snug fit within the assembly. This machining precision not only bolsters the bushing's effectiveness but also extends its service life substantially.

Each insert 19 has a collar 21 with a collar surface 22, and, further, an integral rim 23 projecting perpendicularly from the collar 21 to form the insert 19 as generally L-shaped in cross-section. Each insert 19 has respective, opposing termini such that when joined an insert seam 19a is defined. This insert seam 19a would be trans-axial. Thus, in one embodiment, the insert seam 19a is adjacent to and substantially aligned with sleeve seam 10a. Each rim 23 has an insert outer surface 24, and each insert 19 is packed within the pocket 17, thereby abutting the external surface 12 of each sleeve 8, 9 and the flange 13 of each sleeve 8, 9 (or casing member), and further abutting the lip 16 of each sleeve 8, 9 to thereby be cupped and captured within the pocket 17 by each sleeve 8, 9 with the collar surface 22 exposed and with the insert outer surface 24 extending inward and partially beyond the lip 16.

Figure 5:
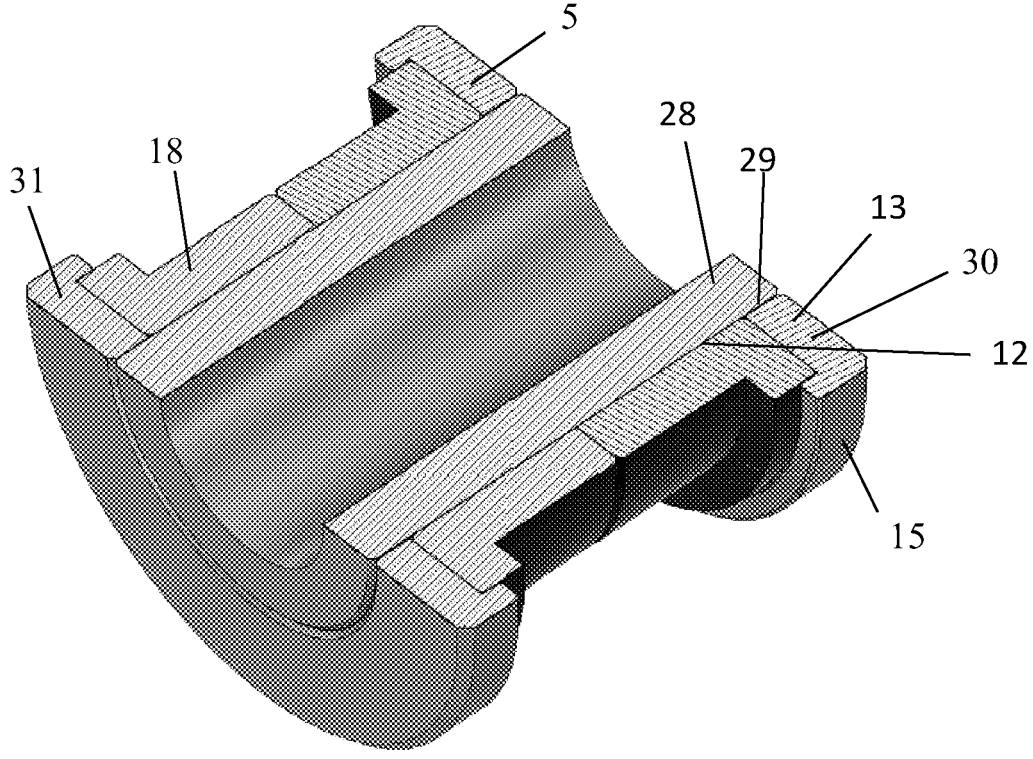
FIG. 5 shows a perspective view in cross-section of an alternative embodiment of a five-piece encasement design with an integral sleeve.
Figure 6:
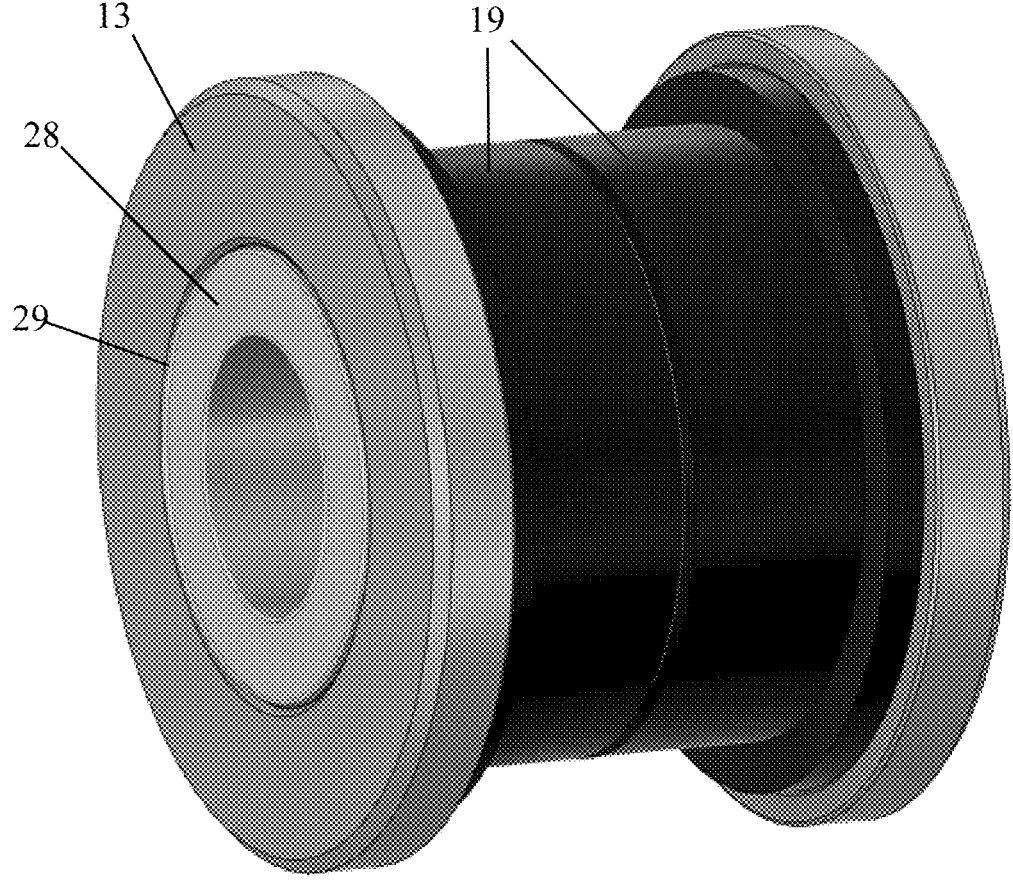
FIG. 6 shows a perspective view of the alternative embodiment of FIG. 5.

With particular reference to FIGS. 5 and 6, shown is an alternative embodiment of the casing subassembly 5 wherein the sleeve is an integral sleeve 28, being whole throughout the length of the bushing system 1 as shown. "Integral sleeve" 28 is used to distinguish from the aforementioned inner and outer, two-piece "sleeves" of the aforementioned embodiment. So here, the case 6 is still split, but split through an alternative, horizontal plane, thus being a plane which is transverse to the first embodiment and forming the case 6 now into three pieces including the integral sleeve 28, with two casing members, i.e. an outer casing member 30 and an inner casing member 31 which now form the flanges 13. Thus, "split" means through either plane and formed of two pieces or three pieces as it relates to case 6. Thus, the flange 13 of case 6 in this latter embodiment is detached from and abuts the integral sleeve 28 at flange surface 29 as shown. Flange surface 29 thereby abuts integral sleeve 28 at the external surface 12 such that the flange surface 29 is substantially parallel to the sleeve outermost surface 15 and aligned with the external surface 12. Accordingly, as shown by both embodiments, "multi-piece" can mean five or four encapsulating members in total which form the casing subassembly 5 and the bushing subassembly 18.

Figure 1A:
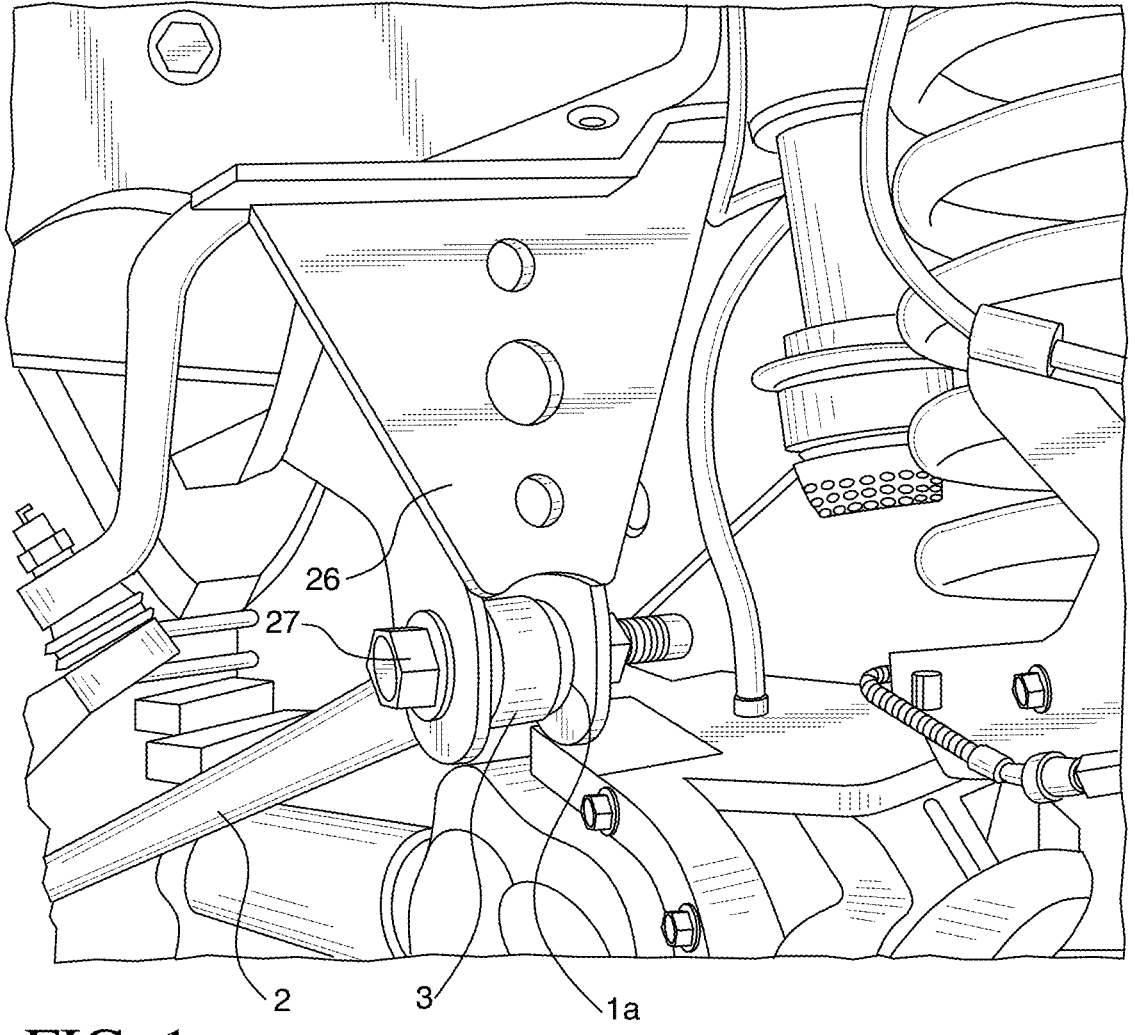
FIG. 1a shows a perspective view of a typical prior art bushing system and track bar installed on a vehicle suspension system frame.

In use therefore, to replace an old bushing 1a (FIG. 1a) and/or install a new track bar assembly, the old bushing assembly 1a will be pressed out, leaving a smooth bore inside the track bar end 3 of track bar 2. The instant bushing system 1 is pushed in manually, in its two halves 7 from opposite sides (or the integral sleeve first for the latter embodiment, then the casing 6). The inserts 19 in either instance are pushed and snapped onto the sleeves 8, 9 held loosely by friction, thereafter inserting the bushing system 1 with sleeves 8, 9 into the track bar end 3, i.e. four (4) pieces total composed of two halves 7 before assembly, then packed using a bolt 27 into frame 26 to complete the assembly.

Upon assemblage, the bushing system 1 thereby comprises multiple pieces encapsulating and defining a central bore 25 underlying the first portions 11 of the sleeves 8, 9 and into which a bolt 27 can be inserted for fastening the bushing system 1 to a frame or chassis of a vehicle with a track bar end 3 of the track bar 2 fastened to the collar surface 22. Moreover, the bushing system 1 aligns perfectly with the vehicle's axle, providing a consistent and stable link. Its design and material choice substantially minimize the misalignment phenomenon, known as "wobble," enhancing the overall vehicle suspension performance especially in new vehicles and those operating in varied terrains.

Factories often employ less effective materials in conventional bushings to minimize manufacturing expenses. While such materials may be more cost-effective, they typically fall short in performance and durability. The instant system, on the other hand, prioritizes performance over production cost. By investing in the current design, 80-90 D Shore durometer material and CNC machining, the system not only outperforms conventional bushings in terms of durability but also addresses challenges observed even in brand-new vehicles. This commitment to design and quality ensures a significant enhancement in vehicle suspension stability and longevity.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A bushing system for a vehicle track bar, comprising:
a casing subassembly, said casing subassembly further comprising an inner sleeve and an outer sleeve; said inner sleeve and said outer sleeve forming said casing subassembly as segmented and cooperatively assembled with respective inward surfaces of said inner sleeve and said outer sleeve configured to join together to define a sleeve seam, each said inner sleeve and said outer sleeve having an external surface, a first portion and a flange extending from an end of said first portion and perpendicularly thereto to thereby form each said inner sleeve and said outer sleeve as generally L-shaped in cross-section; each said flange terminating to form a sleeve outermost surface; each said inner sleeve and said outer sleeve outermost surface extending inward to form a lip; said inner sleeve and said outer sleeve, in combination, forming a pocket defined above each said external surface and below each said lip;
a bushing subassembly, said bushing subassembly further comprising a pair of inserts, each said insert packed within said casing subassembly, each said insert having respective, opposing termini, said termini when joined forming an insert seam, wherein said insert seam is adjacent to and substantially aligned with said sleeve seam;
wherein said casing subassembly and said bushing subassembly formed of multiple, rigid subcomponents with restricted axial movement upon assemblage.

2. The bushing system of claim 1, wherein upon said assemblage, a central bore is defined, said central bore underlying said inner sleeve and said outer sleeve such that a bolt can be inserted through said central bore for fastening said bushing system to a frame of a vehicle.

3. The bushing system of claim 2, wherein both said sleeve seam and said insert seam are trans-axial relative to said central bore.

4. The bushing system of claim 1, wherein said bushing subassembly further comprises:
said lip extending axially;
each said insert having a collar with a collar surface, and each said insert having a rim projecting perpendicularly from each said collar to form each said insert as generally L-shaped in cross-section; each said rim having an insert outer surface; each said insert packed within said pocket, thereby abutting each said external surface, and further abutting each said lip of each said inner sleeve and said outer sleeve to thereby be cupped within said pocket with each said collar surface exposed and with each said insert outer surface extending inward and partially beyond each said lip.

5. The bushing system of claim 1, wherein each said inner sleeve and each said outer sleeve are stainless steel.

6. The bushing system of claim 1, wherein each said insert consists of a bushing material of a hardness range of 80-90 D Shore durometer.

7. A bushing system for a vehicle track bar, comprising:
a casing subassembly, the casing subassembly further comprising: an integral sleeve, said integral sleeve having an external surface; an inner casing member above said integral sleeve, and an outer casing member above said integral sleeve opposite said inner casing member; each said inner casing member and said outer casing member forming a flange over said integral sleeve; each said flange having a flange surface detached from and abutting said integral sleeve at said external surface, wherein said flange surface is substantially parallel to a sleeve outermost surface and aligned with said external surface;
a bushing subassembly, the bushing subassembly further comprising: a pair of inserts, each said insert packed within said casing subassembly over said integral sleeve; each said insert respectively captured by each said inner casing member and said outer casing member, thereby abutting said integral sleeve;
wherein said casing subassembly and said bushing subassembly are formed of multiple, rigid subcomponents with restricted axial movement upon assemblage.

8. The bushing system of claim 7, wherein each said flange includes a lip, said lip extending axially, and wherein said outer casing member and said inner casing member are substantially identical to each other, wherein upon said assemblage, said outer casing member is a mirror image of said inner casing member.

9. The bushing system of claim 8, wherein upon said assemblage, a central bore is defined, said central bore underlying said integral sleeve such that a bolt can be inserted through said central bore for fastening said bushing system to a frame of a vehicle.

10. The bushing system of claim 8, wherein both said flange surface and said external surface are axial relative to said central bore.

11. The bushing system of claim 7, wherein said integral sleeve, said inner casing member and said outer casing member are stainless steel.

12. The bushing system of claim 7, wherein each said insert consists of a bushing material of a hardness range of 80-90 D Shore durometer.

13. The bushing system of claim 7, wherein each said insert has a collar with a collar surface, and each said insert has a rim projecting perpendicularly from said collar to form each said insert as generally L-shaped in cross-section.

\* \* \* \* \*